United States Patent [19]

Graas et al.

[11] Patent Number: 5,088,536
[45] Date of Patent: Feb. 18, 1992

[54] ALL SEASON TYPE TIRE TREAD

[75] Inventors: Maurice Graas, Reichlange; Michel Constant, Bastogne, both of Belgium

[73] Assignee: The Goodyear Tire & Rubber Company, Akron, Ohio

[21] Appl. No.: 521,514

[22] Filed: May 10, 1990

[51] Int. Cl.$^5$ .............................................. B60C 11/11
[52] U.S. Cl. ................... 152/209 R; D12/146
[58] Field of Search .......... 152/209 R, 209 D, 209 A, 152/DIG. 3; D12/137, 146, 147, 148, 149, 151

[56] References Cited

U.S. PATENT DOCUMENTS

| | | | |
|---|---|---|---|
| D. 48,247 | 12/1915 | Gillen | D12/137 |
| D. 55,087 | 5/1920 | Schleicher | D12/137 |
| D. 63,590 | 12/1923 | Schleicher | D12/137 |
| D. 97,083 | 10/1935 | McEvoy | D12/138 |
| D. 242,784 | 12/1976 | Newman | D12/143 |
| D. 245,327 | 8/1977 | Bennett | D12/146 |
| D. 261,498 | 10/1981 | Baus | D12/148 |
| D. 277,469 | 2/1985 | Messer | D12/151 |
| D. 294,930 | 3/1988 | Slagh | D12/147 |
| D. 301,857 | 6/1989 | Clunk et al. | D12/147 |
| D. 304,434 | 11/1989 | Schuller | D12/146 |
| D. 306,989 | 4/1990 | Demaret et al. | D12/147 |
| 4,217,942 | 8/1980 | Takigawa et al. | 152/209 R |
| 4,262,720 | 4/1981 | Hanke . | |
| 4,353,402 | 10/1982 | Burche et al. | 152/209 R |
| 4,779,656 | 10/1988 | Graas . | |
| 4,913,208 | 4/1990 | Anderson et al. . | |

FOREIGN PATENT DOCUMENTS

| | | |
|---|---|---|
| 13584-02 | 3/1985 | Benelux . |
| 13584-01 | 3/1985 | Benelux . |
| 0075760 | 9/1982 | European Pat. Off. . |
| 348335 | 12/1989 | European Pat. Off. ........ 152/209 R |

*Primary Examiner*—Geoffrey L. Knable
*Attorney, Agent, or Firm*—David L. King

[57] ABSTRACT

An all season type tire tread (11) comprises a plurality of laterally extending grooves (36) having curved portions adjacent to each lateral edge (TE1, TE2) of the tread, said curved portions extending in circumferentially opposite directions. Axially spaced zig-zag shaped grooves (4–8) extend circumferentially around the tread, every fourth leg of a zig-zag groove being coincident with a portion of a laterally extending groove (36). Two legs adjacent to said fourth leg connect the laterally extending grooves to short semi-blind grooves (19) having their central portion coincident with every other fourth leg of the zig-zag shaped groove. The various grooves cooperate to define block elements (20–25), arranged in circumferential rows (30–35) and having the shape of an "S" or of a "Z". The blocks can include a plurality of slots (50–53) and humps (29) can be located between neighboring blocks.

15 Claims, 4 Drawing Sheets

ALL SEASON TYPE TIRE TREAD

The present invention relates to all season type treads as well as to pneumatic radial tires including such a tread.

The tread portion of a pneumatic tire generally comprises a plurality of grooves defining ground engaging rubber elements. The particular size and shape of these elements contribute significantly to the overall performance of the tire. Tires are generally designed to provide a particular performance, such as for instance winter, high traction or high speed performance. The obtaining of one particular performance characteristic is usually at odds with obtaining another one. For example, the achievement of good winter performance is obtained at the cost of a reduction of handling; good dry traction of a tire can only be obtained by a reduction of winter performance.

To achieve all season type tire characteristics, low circumferential stiffness designs of the tread pattern are usually chosen because they lead to tires having comparable behavior during the different seasons; the grip of the tire on low friction, unsafe roads is improved whereas the tire's performance on dry, high friction road surfaces remains acceptable.

A tread pattern which provides acceptable all season performance of a tire while maintaining ride, noise and handling characteristics required from tires used in warm seasons has, for instance, been disclosed in European Patent Application No. 0 139 606.

The aim of the invention is to create an all season type tire tread having still better performances than the tread described in the above-identified European patent application.

A further aim of the invention is to provide a tire having a low noise emission and an excellent aquaplaning performance.

A still further aim of the invention is to provide a pneumatic tire behaving in a uniform manner, irrespective of the road surface conditions.

These aims are met by the tire tread as described in the appended claims.

To acquaint persons skilled in the art most closely related to the instant invention, certain preferred embodiments are now described with reference to the annexed drawings. These embodiments are illustrative and can be modified in numerous ways within the spirit and scope of the invention defined in the claims.

For the purpose of this invention, a pneumatic radial tire shall be considered a tire wherein the cords of the carcass reinforcement which extend from bead to bead are laid at cord angles between 65° and 90° with respect to the equatorial plane (EP) of the tire. As used herein and in the claims, an equatorial plane means a plane perpendicular to a tire's axis of rotation and passing through the center of its tread, midway between the sidewalls of the tire. The terms "radial" and "radially" are understood to refer to directions that are perpendicular to the axis of rotation of a tire, the terms "axial" and "axially" are used herein to refer to lines or directions that are parallel to the axis of rotation of a tire and the terms "lateral" and "laterally" are understood to refer to directions going from one sidewall of a tire towards the other sidewall of a tire. "Groove" means an elongated void area in a tread that may extend circumferentially or laterally in the tread in a straight, curved or zig-zag manner. The circumferentially and the laterally extending grooves of the tread pattern described hereafter, have common portions. The grooves are subclassified as "wide", "narrow" or "slot". A "wide" groove has a width greater than 3% of the tread width whereas a "narrow" groove has a width in the range from about 0.8% to 3% of the tread width. A "slot" is a groove having a width in the range from about 0.2% to 0.8% of the tread width. Slots are typically formed by steel blades inserted into a cast or machined mold; inasmuch as slots are so narrow, they are illustrated by single lines. "Tread width" (TW) is defined as the greatest axial distance across a tread, when measured from a footprint of a tire, when mounted on the design rim and subjected to a specified load and when inflated to a specified inflation pressure for said load. Axial widths and other widths of other tread features or components are measured under the same condition as the tread width.

All of the other tire dimensions used herein and in the claims refer to a tire having been mounted on its specified rim and inflated to its specified inflation pressure while not being subject to any load. For any given tire the design rim, inflation and load may be determined from the YEARBOOK OF THE EUROPEAN TYRE AND RIM TECHNICAL ORGANIZATION or the YEARBOOK OF THE TIRE & RIM ASSOCIATION for the year in which the tire is manufactured. It is, however, to be understood that the invention applies to new tires, to retreaded tires as well as to tire treads in strip form being at least partly vulcanized and having a pattern of grooves and raised elements integral therewith.

Figures 1, 2:
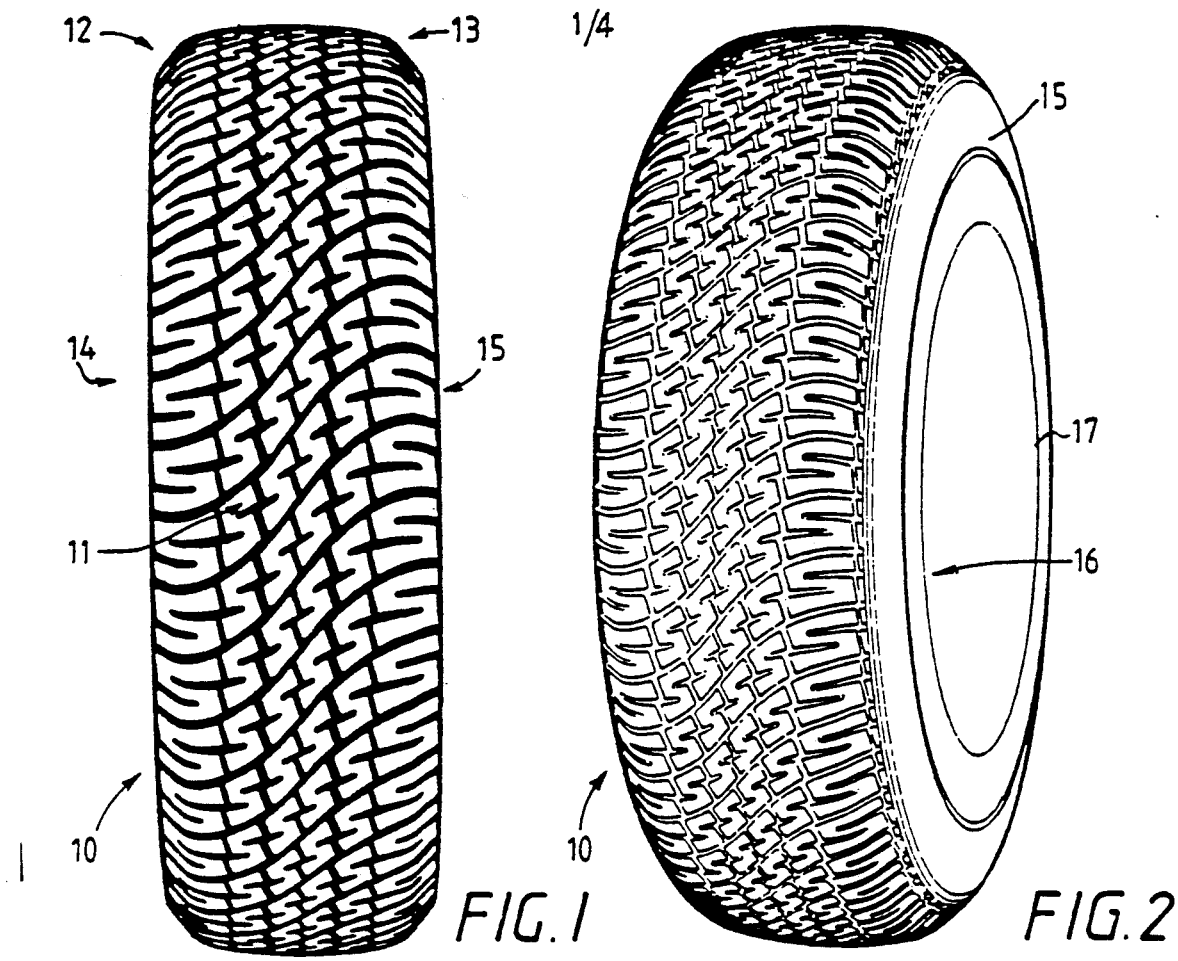
FIG. 1 is a front view of a tire embodying a tread made in accordance with the present invention.
FIG. 2 is a perspective view of the tire shown on FIG. 1.
Figure 4:
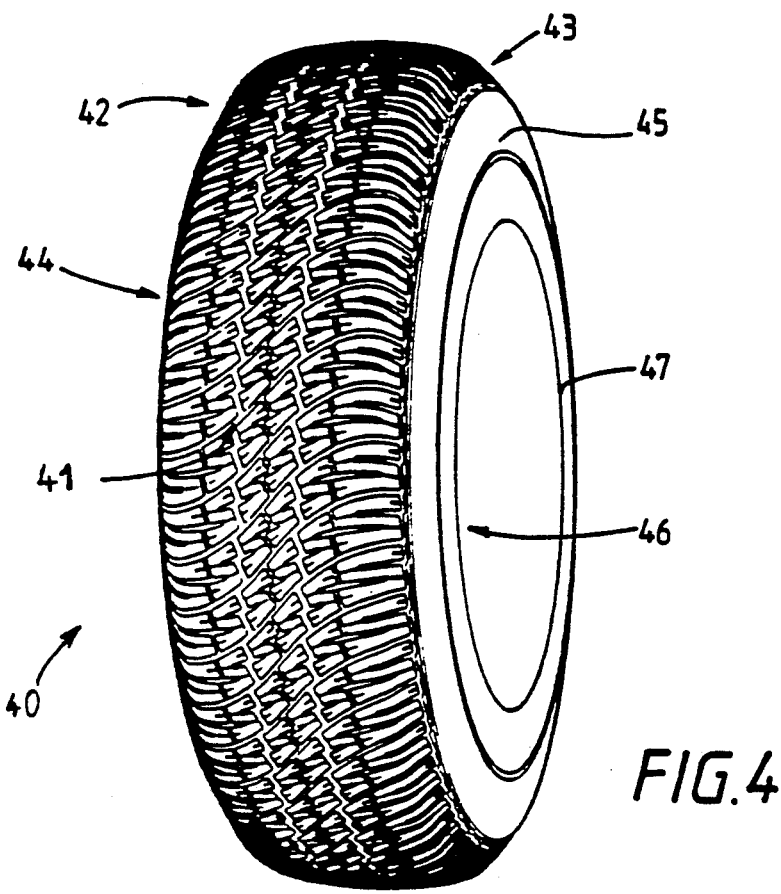
FIGS. 4 and 5 are respectively a perspective view and an enlarged fragmentary view of a tread portion according to another embodiment of the invention.

With reference to FIGS. 1, 2 and 4 there are illustrated pneumatic tires 10, 40 preferably of the radial carcass type, having a ground contacting tread 11, 41. The treads are flanked by a pair of shoulders 12, 13; 42, 43 which are in turn joined to a pair of sidewalls 14, 15; 44, 45 that extend radially inwardly from the tread and each terminates in a bead 16, 17; 46, 47.

Figure 3:
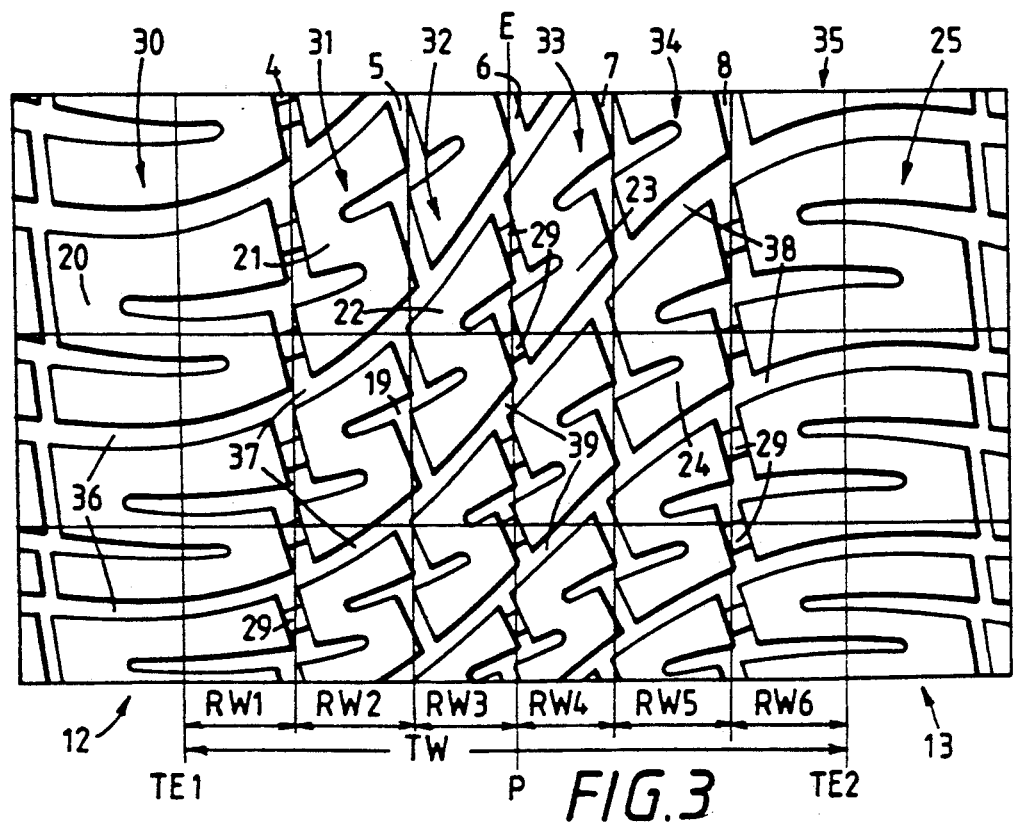
FIG. 3 is an enlarged fragmentary view of a portion of the tread of FIG. 1.

Referring now more specifically to FIG. 3, there is represented an enlarged fragmentary view of the tread of the tire shown in FIGS. 1 and 2. The tread 11 has five circumferentially extending zig-zag grooves 4, 5, 6, 7 and 8 therein, spaced axially apart across the surface of the tread and dividing the tread into six circumferentially extending rows 30–35 (hereafter respectively referred to as central rows 32, 33, intermediate rows 31, 34 and shoulder rows 30, 35) of elastomeric blocks 20–25. As measured in a tire footprint, the axial widths RW2–RW5 of the central and intermediate rows, delimited by the axial mean position of the centerline of the bordering circumferentially extending zig-zag grooves, range from about 10% to 20% of the tread width TW of the ground engaging portion. The central rows 32, 33 have a slightly smaller width than the intermediate rows 31, 34. As measured in a tire footprint, the axial widths RW1, RW6 of the shoulder rows included in the contact patch range from about 15% to 25% of the tread width. The axially outermost parts of the two shoulder rows 30 and 35 of blocks extend past the tread edges into the sidewalls 14 and 15 and have mainly an appearance or aesthetic function.

A plurality of grooves 36 extend across the tread 11 from one lateral edge $TE_1$, to the opposite lateral edge $TE_2$ of the tire. The laterally extending grooves 36 are disposed circumferentially about the tire in a repetitive manner, their widths and inclinations depending on the pitch variation, as is practiced in the industry for tire noise reduction. In the preferred embodiments represented in the figures, the laterally extending grooves 36 are each in the form of an elongated "S" configuration, comprising curved portions 37 and 38, adjacent to the lateral edges $TE_1$, $TE_2$ and a linear central portion 39, which links the two curved portions 37, 38 of a lateral groove. The linear central portion 39 of a lateral groove forms an angle of at least 30° and preferably an angle in the range of 35° to 60°, with the equatorial plane of the tire. The curved portions 37 and 38 of each lateral groove 36 extend in circumferentially opposite directions and change the angle of orientation of the laterally extending groove with respect to the equatorial plane so as to increase said angle as the distance from the centerplane increases. At each lateral edge of the tread $TE_1$, $TE_2$ the curved portions 37, 38 of each laterally extending groove are oriented at an angle of at least 70° and preferably at an angle in the range of 75° to 85° with respect to a plane which is parallel to the equatorial plane of the tire.

It is understood that the exact number of circumferentially extending zig-zag grooves and of laterally extending grooves may vary in accordance with the size of a tire. A minimum of three circumferentially extending zig-zag grooves is, however, considered important to obtain a tread having the required properties. The number of laterally extending grooves 36 is preferably in the range of thirty-seven to fifty-seven with the exact number depending upon the size of the tire. For example a tire of size 185×70 R 14 has 5 circumferentially extending zig-zag grooves and 52 laterally extending grooves. The zig-zag grooves have a plurality of first, second, third and fourth legs.

Every fourth leg of each circumferentially extending zig-zag groove is coincident with a portion of a laterally extending "S" shaped groove. The two legs of the circumferentially extending zig-zag groove which are adjacent to said fourth leg connect the laterally extending grooves 36 to short blind ended grooves 19 which are coincident with every second leg of a circumferentially extending zig-zag groove. The short semi-blind grooves 19 extend laterally on each side of the zig-zag groove, such that their axial projection has a length substantially equal to the axial width of half of the respective block rows, i.e. the rows adjacent to both sides of the circumferentially extending zig-zag groove. By "substantially" is meant a value differing at most by 20% from the reference value. The short semi-blind grooves 19 may be straight or slightly curved along the direction of the adjacent portion of the laterally extending groove 36. The inclination of the short semi-blind grooves 19 depends on their location in the tread: the centermost short semi-blind grooves are oriented at an angle of at least 35° and preferably at an angle in the range of 50° to 75° with respect to the equatorial plane of the tire, whereas the axially outermost short semi-blind grooves are oriented at an angle of at least 70° and preferably at an angle in the range of 80° to 90° with respect to a plane parallel to the equatorial plane of the tire.

The circumferentially and laterally extending grooves cooperate with the short semi-blind grooves to define block elements 20-25 in each row, having all substantially the same geometric shape. In the described embodiment the block elements are "S" shaped in a front elevational view of the tire. The axial extent of the block elements in each row increases as the distance of a row from the equatorial plane increases. By arranging the relative position of the short semi-blind grooves within the block elements circumferentially in opposite order, the block elements will be "Z" shaped; such a tread will be the mirror image of the tread represented in the Figures and should have substantially the same performances and properties.

In order to improve the cornering and shoulder drainage characteristics of the tire, it is of advantage to connect the blocks together in groups of two by elastomeric bridges, referred to herein and in the claims as humps. Such humps 29 are included in the shoulder grooves 4, 8 on both sides of the short semi-blind grooves 19. In other words, the humps 29 are situated between the axially outermost "S" shaped blocks 25 and the axially next adjacent blocks 24, 20 and 21 respectively. The humps have a radial height ranging between 35% and 70% of the radial height of the adjacent blocks. This particular combination of "S" shaped block elements in the shoulder of the tire connected with adjacent circumferentially offset "S" shaped block elements by humps is believed to confer excellent lateral stability to the tread. Due to the interlocking effect brought about by the humps, adjacent blocks support each other to compensate for cornering forces. The humps also prevent the closing of the circumferentially extending groove in the footprint by lateral forces and provide for improved aquaplaning performance and lower noise generation during cornering.

In a preferred embodiment of the invention, humps 29 are also provided in the axially centermost circumferentially extending zig-zag groove 6, between the "S" shaped blocks of the central rows 32, 33 of blocks. In this preferred embodiment, as measured in a tire footprint, the circumferentially extending zig-zag grooves 5, 7 separating the rows of "S" shaped elements linked together in groups of two, have a 60% to 70% greater width than the zig-zag grooves 4, 6, 8 containing the humps.

The laterally extending grooves 36, the zig-zag grooves 4-8 as well as the short semi-blind grooves 19 have widths of between 1.5% and 4% of the tread width TW, as measured in a tire footprint. All of the groove widths being measured perpendicular to the centerline of the groove at the point of measurement. The grooves are arranged on the tread, so that the total area of grooves to the total area of interposed blocks is substantially equal on each side of the equatorial plane. In this particular embodiment the total areas of the block portions are equal to 67% of the tread surface.

Figure 5:
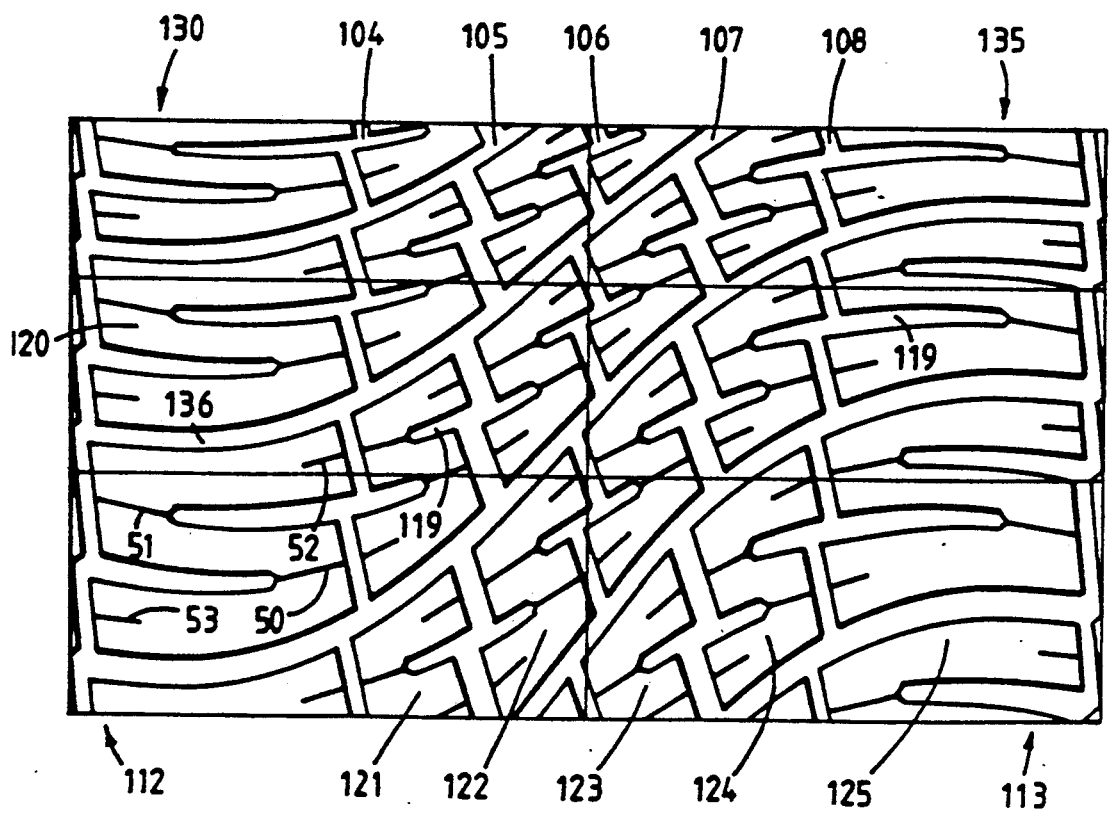

In the embodiment of the invention illustrated in FIGS. 4 and 5, there is provided a plurality of straight slots 50 to 53 in the blocks 120 to 125, in order to improve the winter traction capabilities of the tire. Tread parts comparable to those shown in FIG. 3 bear the same number, increased by 100. In a preferred embodiment, each "S" shaped block includes two slots extending to one peripheral edge of the block only as well as two slots extending between opposite edges of the block; the former (52, 53) are situated at each extremity of the "S" shaped blocks, whereas the latter (50, 51), called hereafter the center slots, are situated in the continuation of the short grooves 119. The inclination of the slots varies according to their location in the tread so that the slots extend halfway between the adjacent short and laterally extending grooves. The centermost slots are oriented at an angle of at least 30° and preferably at an angle in the range of 45° to 70° with planes parallel to the equatorial plane of the tire whereas the axially outermost slots are oriented at an angle of at least 70° and preferably at an angle in the range of 75° to 85° with a plane parallel to the equatorial plane of the tire.

The slots have a conventional design and are well known to those skilled in the art. The slots usually have a radial depth comparable to the radial depth of the grooves surrounding the respective block, but for the purpose of this invention may have a somewhat smaller radial depth. In the embodiment shown in FIG. 5, it is preferred that the slots have a uniform radial depth ranging between 60% and 90% of the radial depth of the grooves.

Figure 6:
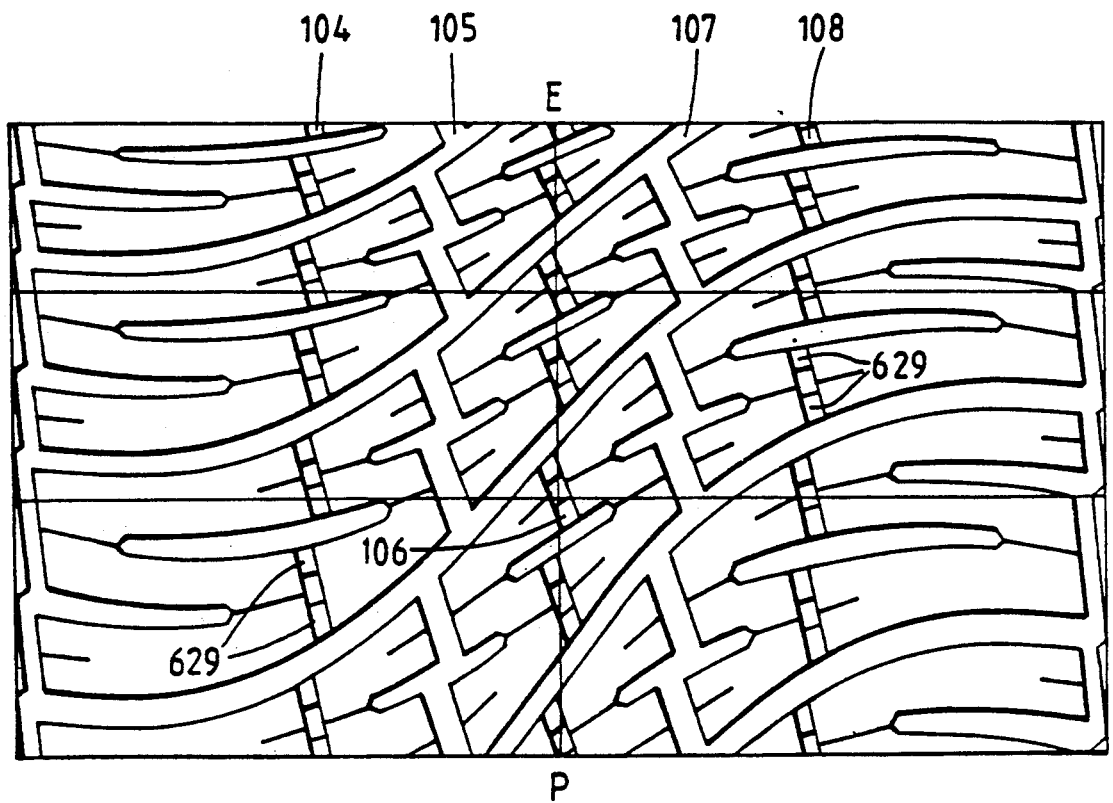
FIGS. 6 to 9 are enlarged fragmentary views of tread portions of other embodiments of the invention.

The tread structure of the embodiment illustrated in FIG. 6 is distinguished from the structure of the embodiment shown in FIG. 5 mainly by the arrangement of humps 629 in the circumferentially extending zig-zag grooves 104, 106 and 108. In order to achieve an excellent lateral stability of high performance tires having a tread width above 185 mm, it is preferred to position two humps in every second leg of the circumferentially extending zig-zag grooves 104, 106 and 108, one hump on each side of the center slot. Each hump has a length ranging between 20% and 40% of the length of the respective leg and a height ranging between 60% and 90% of the adjacent block height.

Figure 7:
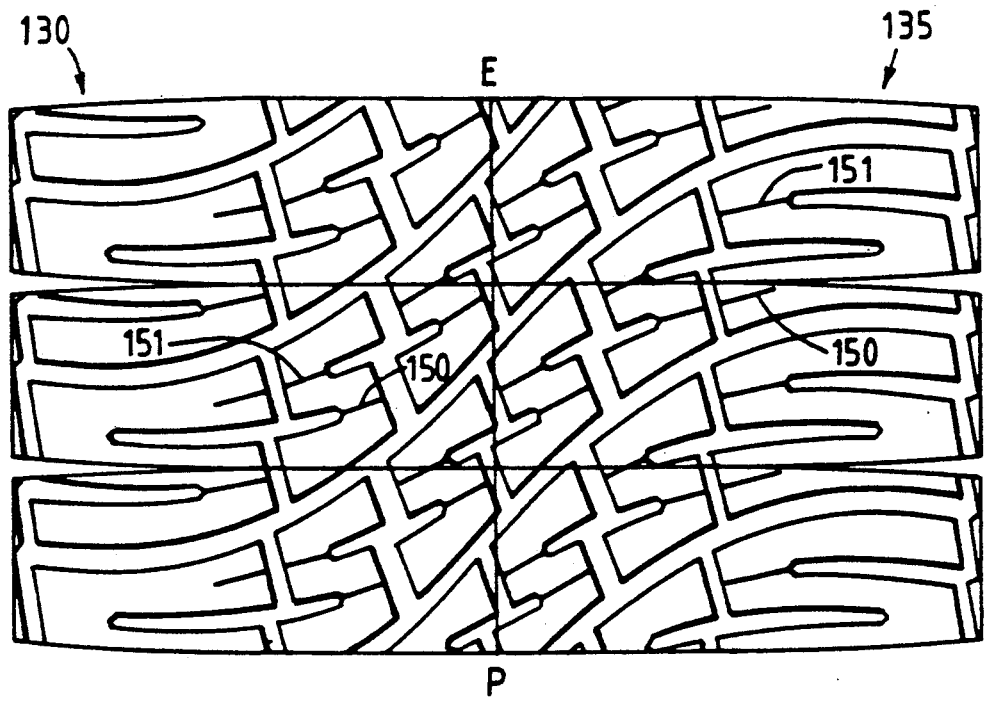

FIG. 7 shows another embodiment of the invention wherein each block element includes only two center slots 150, 151 extending between opposite edges of the block. The slots have a uniform radial depth ranging between 70% and 100% of the radial depth of the grooves surrounding the respective block.

Figure 8:
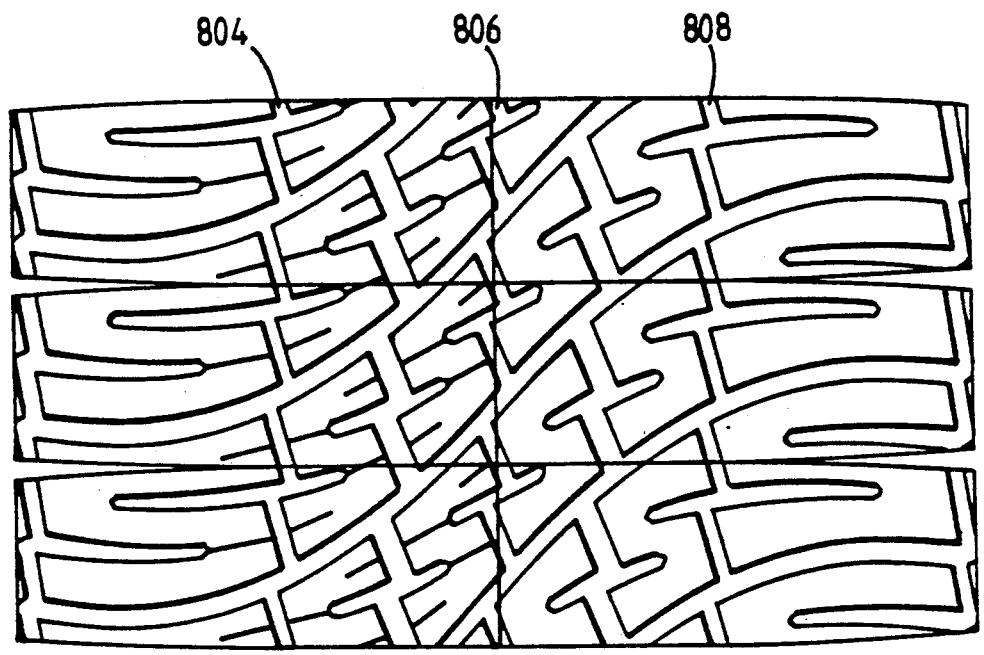

In FIG. 8 is represented an asymmetric tread structure including on a first lateral portion the tread structure shown in FIG. 4 and on a second lateral portion the tread structure shown in FIG. 3, the two lateral Portions being separated by the equatorial plane. The slots in the blocks have a uniform depth ranging between 60% and 90% of the depth of the grooves surrounding the respective block. The circumferentially extending zig-zag grooves 804, 806 and 808 include humps as shown in FIG. 6. The advantages of such a tread structure are lower noise and improved wet handling.

Figure 9:
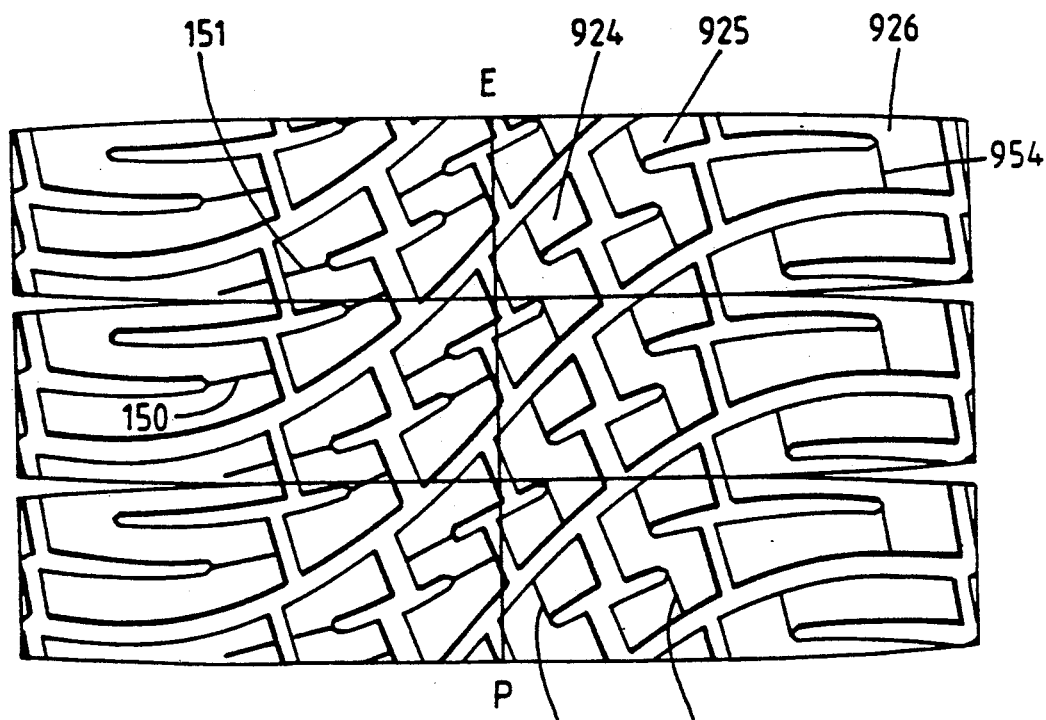

FIG. 9 illustrates Yet another asymmetric tread structure, including on a first lateral portion having blocks with slots as of the tread structure shown in FIG. 7 and on a second lateral portion, blocks 924, 925 and 926 with slots oriented almost transversely to the slots of the first lateral portion of the tread. The slots 954, 955 in the blocks 924-926 start at the end of the short semi-blind grooves and extend substantially parallel to the neighboring circumferentially extending zig-zag groove, into the nearest laterally extending groove. The slots in the first and second lateral portions have a radial depth in the range of 60% and 90% of the radial depth of the grooves surrounding the respective block.

It is to be understood that the rows of blocks, having different properties, need not to be separated by the equatorial plane. It is however necessary, in order to implement the invention, that the blocks situated in the same row, include the same number of slots therein having the same layout and depth.

Example: A steel belted radial carcass tire of size 175/70 R 13 has a treadwidth of about 132 mm and the rows of blocks have axial widths RW1, RW2 and RW3 of about 24, 23 and 19 mm respectively. The pitch ratios are 17, 21 and 26 and the tread includes 52 circumferentially spaced pitches.

The grooves have radial depths of about 8.3 mm and their widths depend on the axial position of the different grooves in the tread and they depend also on the pitch value. The laterally extending grooves have widths ranging between about 2.3 and 4.8 mm. The short semi-blind grooves have widths ranging between about 2.5 and 4.8 mm. The central circumferentially extending zig-zag groove (reference 106 in FIG. 6) has widths ranging between about 2.9 and 3.2 mm, the intermediate circumferentially extending zig-zag grooves (references 105 and 107) have widths ranging between 4.6 and 4.8 mm and the axially outermost circumferentially extending zig-zag grooves (references 104 and 108) have a width of about 2.8 mm; it is understood that these values are for portions of the zig-zag grooves which are not coincident with a short semi-blind groove or with a laterally extending groove.

The humps are positioned as described in connection with FIG. 6 and have heights of about 4.15 mm. The blades are also located and oriented as shown on FIG. 6, their radial depths being substantially equal to 80% of the radial depths of the surrounding groove.

The single carcass ply comprises polyester reinforcement cords. The belt structure comprises two single cut plies reinforced by 2×0.30 high tensile steel cables, having a density of about 24 ends per inch and forming angles of about 22° with the equatorial plane, the angles of the cables in different plies opposing each other.

The tread comprises an elastomeric compound having a modulus ranging between 6 and 7 MPa, a Shore A hardness ranging between 60 and 65, an elongation of about 600% and a tensile strength ranging between 16 and 18 MPa.

While certain representative embodiments have been described for the purpose of illustrating the invention, it will be apparent to those skilled in the art that various changes and modifications may be made therein without departing from the spirit or scope of the invention.

We claim:

1. An all season type tire having a tread comprising an elastomeric substance extending circumferentially about the axis of rotation of the tire, said tread having:
   a pair of shoulders which define the lateral edges of a ground engageable surface;
   a plurality of laterally extending grooves having curved portions adjacent each lateral edge, each said curved portions extending in opposite directions so as to have the laterally extending groove being the shape of an elongated "S" or "Z"; and
   at least three circumferentially extending axially spaced wide zig-zag shaped grooves, having a plurality of first, second, third and fourth legs every fourth leg of a said laterally extending grooves and the two adjacent legs to said fourth leg connecting the laterally extending grooves to short semi-blind grooves each having a central portion coincident with every second leg of blind grooves being straight or slightly curved over its entire length, said circumferentially extending, laterally block elements, arranged in circumferential rows and having the shape of an "S" or a "Z" wherein the semi-blind grooves extend substantially half the axial width of the respective adjacent block rows.

2. A tread according to claim 1, comprising five circumferentially extending zig-zag grooves spaced apart axially by a distance ranging between 15% and 25% of the tread width.

3. A tread according to claim 1, wherein the laterally extending grooves each have a linear portion, which crosses the equatorial plane at an angle ranging between 35° and 60°.

4. A tread according to claim 1 and 3, wherein the axially outermost portions of the laterally extending grooves are oriented at an angle of at least 70° with respect to a plane parallel to the equatorial plane and passing through a lateral edge of the tread.

5. A tread according to claim 1, wherein the axially centermost short semi-blind grooves are oriented at an angle of at least 35° with respect to a plane parallel to the equatorial plane.

6. A tread according to claim 2, wherein the laterally extending grooves, circumferentially extending zig-zag grooves and the short semi-blind grooves have widths ranging between 1.5% and 4% of the tread width.

7. A tread according to claim 1, wherein the ratio of block surface area in a footprint to total footprint area ranges between 60% and 75%.

8. A tread according to claim 1, further comprises humps defined as elastomeric bridges located within a groove and connecting adjacent block elements, said humps having a radial height ranging between 35% and 70% of the radial height of adjacent block elements and wherein at least one hump is located between each block of an axially outermost block row and the neighboring block of the next adjacent row.

9. A tread according to claim 8, wherein at least one hump is located between two axially adjacent blocks of the center rows.

10. A tread according to claim 8 or 9, wherein two humps are located on each side of the short semi-blind grooves, the humps having a radial height ranging between 35% and 70% of the radial height of the adjacent blocks.

11. A tread according to claim 1, wherein each block element has at least one slot therein.

12. A tread according to claim 1, wherein there are five circumferentially extending zig-zag grooves dividing the tread into 6 rows of block elements having the shape of an "S" or "Z", the block elements of at least two adjacent rows have each two slots extending to one peripheral edge of the block portion only as well as two slots extending between opposite edges of the block portion, the former being situated at each circumferential extremity of the blocks, and the latter being situated in the continuation of the short semi-blind grooves and wherein the inclination of the slots varies according to their location in the tread so that the slots extend substantially halfway between the adjacent laterally extending and short semi-blind grooves.

13. A tread according to claim 1, wherein there are five circumferentially extending zig-zag grooves dividing the tread into 6 rows of blocks having the shape of an "S" or "Z", the blocks have each two slots extending to one peripheral edge of the block only as well as two slots extending between opposite edges of the block, the former being situated at each extremity of the blocks, and the latter being situated in the continuation of the short semi-blind grooves, wherein the inclination of the slots varies according to their location in the tread so that the slots extend substantially halfway between the adjacent laterally extending and short semi-blind grooves, and wherein one hump is located on each side of the short semi-blind grooves between two axially adjacent blocks of the center rows and between two axially adjacent blocks of an axially outermost block row and the next adjacent block row, the humps having a radial height ranging between 35% and 70% of the radial height of the adjacent blocks.

14. A tread according to claim 1 or 12, wherein at least two adjacent rows of blocks include two slots starting each at the end of a short semi-blind groove and extending across the block, substantially parallel to the neighboring circumferentially extending zig-zag groove, into the nearest laterally extending groove.

15. A tread according to either of the claims 11 or 12, wherein the slots have a radial depth ranging between 70% and 100% of the groove radial depth.

* * * * *

UNITED STATES PATENT AND TRADEMARK OFFICE
CERTIFICATE OF CORRECTION

PATENT NO. : 5,088,536

DATED : February 18, 1992

INVENTOR(S) : Maurice Graas, Michel Constant

It is certified that error appears in the above-identified patent and that said Letters Patent is hereby corrected as shown below:

```
Column 5, line 48, change "Portions" to be --portions--.
Column 5, line 56, change "Yet" to be --yet--.
Column 6, line 65, after "leg of a" insert --zig-zag groove
being coincident with a portion of one of--.
Column 7, line 1, after "second leg of" insert --the
circumferentially extending zig-zag groove, the semi--.
Column 7, line 3, after "laterally" insert --extending and
short semi-blind grooves cooperating to define--.
```

Signed and Sealed this

Seventh Day of September, 1993

Attest:

BRUCE LEHMAN

Attesting Officer    Commissioner of Patents and Trademarks